Patented Apr. 3, 1945

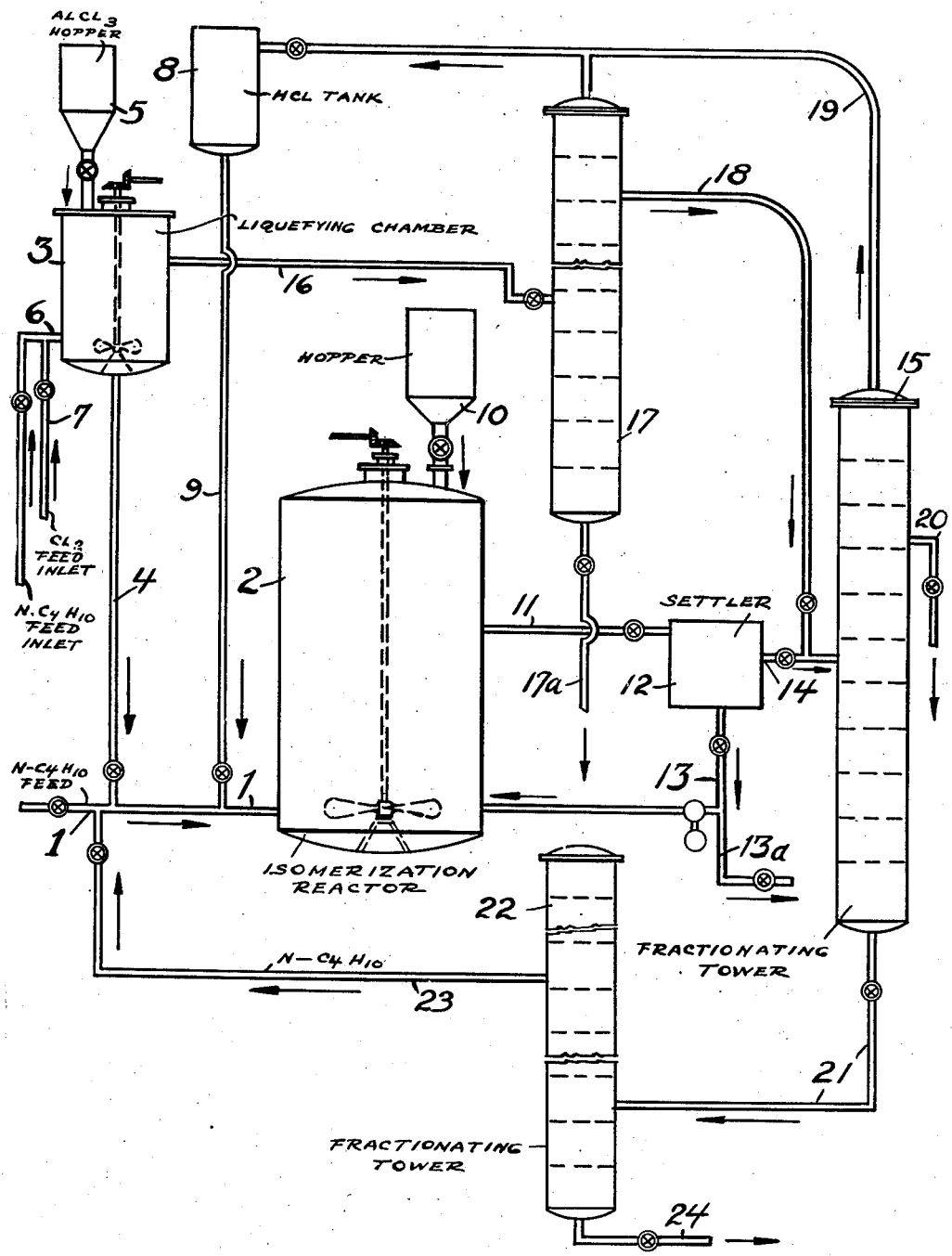

2,373,063

UNITED STATES PATENT OFFICE 2,373,063

ISOMERIZATION OF HYDROCARBONS

Eldon E. Stahly, Pittsburgh, Pa., and Louis E. Pirkle, Baton Rouge, La., assignors to Standard Oil Development Company, a corporation of Delaware Application October 11, 1941, Serial No. 414,588

8 Claims. (Cl. 260—683.5)

The present invention relates to an improved method for the conversion of aliphatic hydrocarbons and more particularly to a new type of catalyst for isomerizing normal straight chain paraffin hydrocarbons.

It is known that normal paraffin hydrocarbons can be isomerized by means of Friedel-Crafts catalysts, such as aluminum chloride or bromide, zinc chloride, ferric chloride, and the like. Activators for such catalysts, such as hydrogen halides, have been generally employed to prolong the life and increase the activity of the catalyst.

The present invention relates particularly to a new catalyst suitable for the isomerization of paraffin hydrocarbons of boiling point not greater than that of straight run naphthas, and more specifically to the isomerization of n-butane and n-pentane. One of the disadvantages arising in the use of solid aluminum halides as catalysts is the requirement for efficient solid-liquid contacting during the earlier stages of its use, before liquefaction of the catalyst results. It has been found that the solid aluminum halides may be converted into a highly satisfactory liquid catalyst for isomerization by reacting the same in the liquid phase with a low molecular weight normal paraffin hydrocarbon, e. g., propane or butane, and a free halogen, e. g., chlorine or bromine. The same paraffin hydrocarbon which is to undergo isomerization treatment may conveniently be used for the preparation of the catalyst. The aluminum halide treated usually requires heating in the presence of the reactants, and a temperature of 100° F. to 200° F. is generally satisfactory for this purpose. Sufficient pressure should be employed to maintain the hydrocarbon in the liquid phase.

A further advantage in the use of the combination of free halogen, low molecular weight paraffin hydrocarbon and aluminum halide is found in the fact that when these materials are reacted together, some of the hydrocarbon is broken down to form olefins, which, by an alkylation reaction, unite with the paraffin to form higiher molecular weight paraffinic hydrocarbon materials which exhibit a high octane number and may be used as motor fuels, either alone or in combination with the isomerization products of the present invention.

The new catalyst of the present invention may be used not only in isomerization processes, but also in the alkylation of paraffin hydrocarbons by the reaction of the same with olefins, as well as for the polymerization of low molecular weight olefins to form polymers of the motor fuel range. In the alkylation processes at least one paraffin is reacted with at least one olefin, as in the reaction of isobutane with butylenes. In polymerization two or more similar or dissimilar olefins are reacted, as in the reaction of isobutylene with itself or with n-butylenes.

In the preparation of the new catalyst any of the aluminum halides, preferably the chloride or bromide, may be used, together with a free halogen, preferably chlorine or bromine, and a low molecular weight paraffin hydrocarbon of boiling point not higher than straight run naphtha. A catalyst which is particularly satisfactory, especially when n-butane is to undergo isomerization, is prepared by reacting aluminum chloride with chlorine in the presence of n-butane at a temperature of 150° F. to 200° F. The amount of halogen added is preferably within the range from 10% to 30%, based on the amount of aluminum halide present, and the amount of hydrocarbon may conveniently range from 100% to 300%, based on the aluminum halide. Care should be taken in the mixing of the halogen and hydrocarbon to avoid the formation of explosive mixtures. In general, the ratio of free hydrocarbon to free halogen in contact with each other at any time should be maintained at a value of at least 10 to 1, preferably 20 to 1 or higher. In a typical preparation 1750 grams of aluminum chloride were stirred with 4350 grams of n-butane while 652 grams of chloride were gradually added during a period of about one-half hour. The temperature was maintained at 150° F. After an additional 1½ hours of stirring, the hydrogen chloride and butane products were distilled off and a greenish liquid catalyst resulted which was associated with about 5% hydrocarbon.

As stated above, the new catalyst possesses the great advantage of being in liquid form throughout the isomerization process and may therefore be employed in equipment designed for liquid-liquid contacting methods, e. g., jet dispersion devices, porous thimbles, centrifugal pumps, turbo-mixers and the like. The catalyst has the further advantage of being more efficient in the conversion of the normal hydrocarbons to branched chain form. For example, it has been found that in a series of cycles of operation in a turbo-mixer at 150° F., in which a catalyst prepared by reacting aluminum chloride with chlorine and n-butane was used for the isomerization of n-butane, together with a promoter consisting of 9% hydrogen chloride and 1% chlorine, there was obtained an average yield of 50% of isobutane. Similar operations with a solid catalyst in the turbo-mixer required temperatures of 175° F. to 200° F. to produce the same yield. It has also been found that the life of the liquid catalyst is at least as good as that of the solid aluminum chloride catalyst.

It is desirable to use a catalyst promoter with the new catalyst of the present invention, and such promoters may be any of those well known for promoting the action of Friedel-Crafts catalysts. These promoters include hydrogen halides, such as hydrogen chloride or bromide, free chlorine or bromine, alkyl halides, particularly methyl, ethyl, and propyl chlorides and bromides, as well as carbon tetrachloride and chloroform, and water.

The present process is capable of converting normal paraffins, having at least four carbon atoms per molecule, such as normal butane, normal pentane, normal hexane, normal hetpane and higher homologs, particularly those having boiling points not higher than that of straight run naphtha, into their corresponding branched or isoforms, such as isobutane, isopentane and the like. The feed stock may also comprise mixtures of more than one of these straight chain paraffins, or, if convenient, the paraffinic hydrocarbon mixture may contain small proportions of branched chain paraffins, although for greatest efficiency the hydrocarbon feed stock should comprise essentially straight chain paraffins. Mixed paraffins, such as straight run naphtha, field butanes, etc., may thus be converted into isomeric mixtures which have an increased value with respect to anti-detonation qualities when used as motor fuels and with respect to the facility with which they may enter into further chemical reactions to produce alkylation products when reacted with olefins. In general, any hydrocarbon mixture composed predominately of saturated straight chain hydrocarbons of at least four carbon atoms per molecule is suited as a feed stock for the process herein outlined. A product containing substantial amounts of branched chain isomers may be separated from the reaction medium and fractionated within the desired boiling range. The constituents boiling above and below the desired range may then be returned to the isomerization reactor to suppress their further formation or to be further isomerized to more useful products.

The reaction may be carried out in batch, for example, in a bomb or autoclave, preferably fitted with agitation apparatus; but continuous flow processes are preferred in which the normal paraffin is passed in liquid phase through a reaction vessel containing the catalyst. The catalyst may be continuously formed in a liquefying chamber by supplying the dry powdered catalyst from a hopper and continuously feeding in the hydrocarbon in liquid form and the halogen required for the preparation of the liquid catalyst. This catalyst may then be continuously introduced into the isomerization reactor. During the formation of the catalyst some of the hydrocarbon is converted to higher molecular weight paraffinic materials which may be taken off overhead from the liquefying chamber with the hydrogen chloride formed and separated and used as motor fuel. Such material has been found to have a high octane number.

The catalyst activator is preferably added to the feed stock, but it may be added to the isomerization reactor by independent means so as to be distributed more evenly through the catalyst mass. It is not necessary to add the activator continuously and it may be added from time to time as the catalyst shows deterioration. The amount of activator varies with the nature or age of the catalyst and temperature and other conditions, but ordinarily the amount is from 0.5% to 15% of the feed stock treated.

The conditions for isomerizing with the present catalysts are much the same as those formerly employed with dry aluminum halide catalysts. A wide temperature range may be employed, for example, from about 30° F. to 300° F. At these temperatures the isomerization may be effected in the liquid phase and without substantial side reactions. The time of the reaction varies with other factors, such as temperature, the amount of catalyst, the particular catalyst used, and the particular feed stock being treated. In general, however, the time of reaction may be from one-half to thirty hours; and conditions are usually adjusted to obtain a conversion of 40% to 75% at a temperature of, for example, 100° F. to 250° F. for a n-butane and 75° F. to 125° F. for n-pentane.

The amount of catalyst to be used varies widely, depending upon the particular hydrocarbon which is to be converted, the amounts ranging from 2% to 100%, these amounts being calculated as parts by weight of aluminum chloride as compared with the hydrocarbon material present in the reactor. In the case of the conversion of butane, when using aluminum chloride for the preparation of the liquid catalyst, a suitable proportion of the catalyst as been found to be that which is equivalent to about 10% to about 50% of aluminum chloride, based on the amount of feed stock used, and the corresponding amount of activator, such as hydrogen chloride, or a mixture of hydrogen chloride and chlorine, is advantageously about 10% by weight of the feed stock.

The reaction is preferably carried out under liquid phase conditions. Hence, any temperature below the critical temperature of the feed stock may be employed, although it is preferable to use the temperatures specified above. Sufficient superatmospheric pressure may be employed to maintain the reactants, as well as the reaction products, in the liquid phase under the reaction conditions obtained. Free hydrogen may be introduced to raise the pressure to, say, 400 to 500 lbs./sq. in. gauge. This material aids in suppressing cracking and tends to prolong the life of the catalyst. In particular, liquid phase operations are conducive to the production of ordinarily high yields and to the carrying out of the process in a continuous manner. It is to be understood, however, that the process is not only applicable to continuous operation, but it is contemplated to carry the same out in batch type apparatus for single batch operation. Where the reaction is carried out in the liquid phase, it has been found advantageous to agitate the reaction mixture so that intimate contact is established between the feed and the catalyst, as heretofore described.

A typical arrangement of apparatus for carrying out the present invention is illustrated in the drawing, in which the arrangement is shown in schematic outline. In this apparatus, designed particularly for the continuous isomerization of normal butane, the butane feed is introduced through line 1 into the isomerization reactor 2. The liquid catalyst is prepared in liquefying chamber 3 by feeding dry aluminum chloride from hopper 5 into this chamber and by introducing a mixture of chlorine and n-butane through line 6. This mixture is conveniently formed by passing chlorine through line 7 into the n-butane feed line 6. Sufficient agitation, as well as temperature and pressure conditions, are maintained in chamber 3 for the production of liquid catalyst at the rate required. The catalyst is introduced into the feed to the isomerization reactor by means of line 4. Simultaneously a promoter, such as hydrogen chloride, is introduced into line 1 from tank 8 through line 9. A hopper 10 is provided for introducing dry aluminum chloride directly into the isomerization reactor when it is desired to form the initial charge of catalyst in the isomerization reactor itself. The total product of reaction passes out through line 11 to settler 12, where the partially spent liquid catalyst is separated from the hydrocarbon product and is pumped back to the reactor through line 13, a portion of the same being removed from the system through line 13a. The separated hydrocarbon product is passed through line 14 to fractionating tower 15, where the volatile catalyst promoter, such as hydrogen chloride, and any free hydrogen, if it is employed, is removed and returned through line 19 to tank 8 for further use, and at the same time the desired isobutane product is removed through line 20. The heavier hydrocarbons are removed as bottoms through line 21 and introduced into a second fractionating tower 22. In this tower the unreacted normal butane is separated and returned to the original feed line, while heavier products are removed through line 24 and may be used as motor fuel. In the preparation of the liquid catalyst in chamber 3, higher molecular weight hydrocarbons will be formed and may be removed with by-product hydrogen chloride through line 16 and fractionated in fractionating tower 17, where the hydrogen chloride is first removed and introduced into line 19 to be returned to the hydrogen chloride tank 8. At the same time any butane present is removed through line 18 and introduced into fractionating tower 15 through line 14, and the heavier products from tower 17 are removed through line 17a and may be used as motor fuel. The isobutane product may be blended with the motor fuel fractions drawn off in the process through lines 17a and 24.

On the basis of a reactor unit of a capacity of about 1,000 bbls. of n-butane per day, the reactor capacity should be from 80 to 100 bbls. of butane to accommodate about 40 bbls. per hour feed rate with a contact time of about two to three hours. For this quantity of butane about 6800 lbs. of aluminum chloride in the form of the liquid complex (40% by weight based on butane) should be present in the reactor described above. Of course, longer contact times would require less catalyst and shorter contact time (higher feed rate) can be used with larger amounts of catalyst. The feed rate and settler capacity should be correlated so that no catalyst is lost from the settler with the product. The initial charge of aluminum chloride (6800 lbs.) is liquefied either in the isomerization reactor itself with about 80 bbls. of butane and 3 to 4 bbls. of liquid chlorine, or it can be prepared slowly and continuously in the small liquefaction reactor (1 bbl. capacity) until 6800 lbs. of aluminum chloride are liquefied and charged into the isomerization reactor. It is preferred, however, to charge the initial aluminum chloride to the isomerziation reactor, liquefy it by agitation with butane and chlorine for about two hours at 150° F. to 200° F., and then start the continuous operations wherein the aluminum chloride liquid complex is continuously prepared and fed into the isomerization reactor at a replacement rate sufficient to maintain 40% to 60% conversion to isobutane. On the basis of a plant designed to treat 1,000 bbls. of n-butane per day and production of 15 to 16 gals. of isobutane per pound of aluminum chloride, the liquid catalyst is prepared in the small liquefier for replacement by feeding about 40 lbs. of aluminum chloride, about ½ bbl. of butane and 10 lbs. (0.8 gal.) of liquid chlorine per hour. Agitation at 150° F. to 200° F. with a reaction time of 2 to 3 hours forms a very active combination which is fed continuously as formed to the isomerization reactor without interrupting the action of the isomerization system. An equal amount of catalyst is withdrawn from the reactor to maintain a constant amount of aluminum chloride in the system. By such a procedure 40% to 60% conversion of n-butane to isobutane can be maintained. The catalyst life may be considerably improved by carefully removing hydrocarbon fractions of higher boiling point from the recycled butane.

The process of the present invention, in which a liquefied aluminum halide catalyst is used to promote the isomerization of n-butane, is illustrated by the following example of a batch process, which is given by way of illustration and is not restrictive of the scope of the invention in any way.

*Example*

A liquid catalyst suitable for isomerizing n-butane was prepared by introducing a charge of liquid n-butane into a turbo-mixer together with 40% by weight of dry aluminum chloride and 15% by weight of liquid chlorine. The mixture was agitated for two hours under a gauge pressure of 310 lbs./sq. in. and at a temperature of 148° F. At the end of the period the excess of hydrocarbon material was decanted off. This decanted material was fractionated and the portion containin $C_5$ and higher hydrocarbons was found to consist chiefly of isopentane with small amounts of n-pentane and higher boiling hydrocarbons and to have a bromine number of 0 and an octane blending value of 87.5. An isomerization cycle was then conducted by replacing the decanted hydrocarbon with an equal amount of fresh n-butane and a promoter was added consisting of 13.5% by weight of hydrogen chloride and 1.5% by weight of chlorine. The charge was agitated for two hours under a pressure of 270 lbs./sq. in. gauge at a temperature of 150° F. 60% of the product was removed and another cycle prepared by recharging a fresh quantity of n-butane and adding the same amounts of hydrogen chloride and chlorine as in the first cycle. This process was conducted until a total of 29 isomerization cycles had been completed. The pressure during this series of cycles varied from 270 to 325 lbs./sq. in. gauge and the temperature was maintained at almost exactly 150° F. in each cycle. The product was analyzed from time to time and found to contain from 51.5% to 61.9% of isobutane, with an average of 58.2% of isobutane.

The present invention is not to be limited in any way by the examples, which are given by way of illustration only, but only by the terms of the following claims.

We claim:

1. A process for the isomerization of normal paraffin hydrocarbons having at least four carbon atoms per molecule but having a boiling point not higher than that of a straight run naphtha which comprises the steps of preparing a concentrated liquid catalyst by reacting together 100 parts by weight of an aluminum a low halide, about 100 to about 300 parts by weight of a low molecular weight paraffin hydrocarbon and about 10 to about 30 parts by weight of a halogen, at a temperature of 100° F., introducing said catalyst into a reactor suitable for liquid phase contacting, introducing the hydrocarbon to be isomerized into the reactor, contacting the hydrocarbon and catalyst in liquid phase under isomerizing conditions, and separating the isomerized product from the catalyst.

2. A process according to claim 1 in which the aluminum halide is aluminum chloride and the halogen is chlorine.

3. A process for the isomerization of normal butane which comprises the steps of preparing a concentrated liquid catalyst by reacting together 100 parts by weight of aluminum chloride, about 100 to about 300 parts by weight of normal butane and about 10 to about 30 parts by weight of chlorine, at a temperature of about 150° to about 200° F., introducing said catalyst into a reactor suitable for liquid phase contacting, introducing the butane to be isomerized into the reactor, contacting the butane and catalyst in liquid phase under isomerizing conditions, and separating the isomerized product from the catalyst.

4. A continuous process for the isomerization of normal paraffin hydrocarbons having at least four carbon atoms per molecule but having a boiling point not higher than that of a straight run naphtha which comprises continuously introducing the hydrocarbons to be isomerized into a reactor suitable for liquid phase contacting, continuously introducing into the said reactor a concentrated liquid catalyst prepared by reacting together 100 parts by weight of an aluminum halide, about 100 to about 300 parts by weight of a low molecular weight paraffin hydrocarbon and about 10 to about 30 parts by weight of a halogen, at a temperature of 100° to 200° F., continuously contacting the hydrocarbon and catalyst in liquid phase under isomerizing conditions, and continuously removing the isomerized product and spent catalyst from the reactor.

5. A continuous process for the isomerization of normal butane which comprises continuously introducing the butane into a reactor suitable for liquid phase contacting, continuously introducing into the said reactor a concentrated liquid catalyst preparted by reacting together 100 parts by weight of aluminum chloride, about 100 to about 300 parts by weight of normal butane and about 10 to about 30 parts by weight of chlorine, at a temperature of about 150° to about 200° F., continuously contacting the butane and catalyst in liquid phase under insomerizing conditions, and continuousl removing the isomerized product and spent catalyst from the reactor.

6. A process according to claim 5 in which any free paraffin hydrocarbon material and any hydrogen chloride present is substantially removed from the catalyst by distillation before the catalyst is passed to the isomerization reactor.

7. A catalyst composition comprising the product prepared by reacting together 100 parts by weight of normal butane, about 30 to about 100 parts by weight of aluminum chloride, and about 10 to about 30 parts by weight of chlorine, at a temperature of about 100° to about 200° F., and removing free paraffin hydrocarbons and hydrogen chloride subsequent to such reaction.

8. A catalyst composition comprising the product prepared by reacting together 100 parts by weight of normal butane, about 40 parts by weight of aluminum chloride and about 15 parts by weight of chlorine, at a temperature of about 150° to about 200° F., and removing free paraffin hydrocarbons and hydrogen chloride subsequent to such reaction.

ELDON E. STAHLY.
LOUIS E. PIRKLE.